March 27, 1973   J. BATTIGELLI   3,723,362
LOW DENSITY POLYSTYRENE PEARLS AND METHODS OF MAKING THEM
Filed Oct. 21, 1968   2 Sheets-Sheet 1
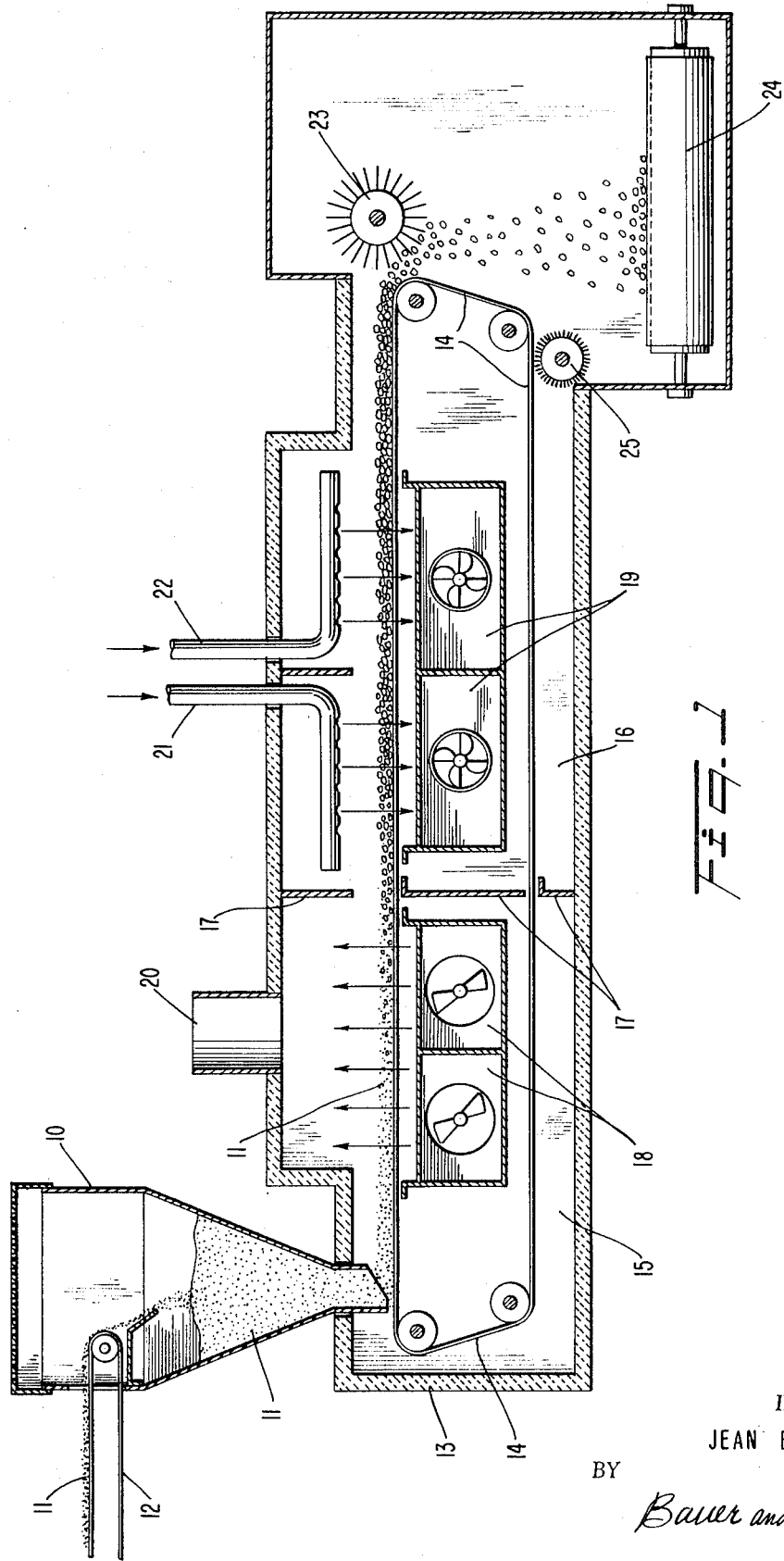
INVENTOR.
JEAN BATTIGELLI
BY
Bauer and Seymour
ATTORNEYS

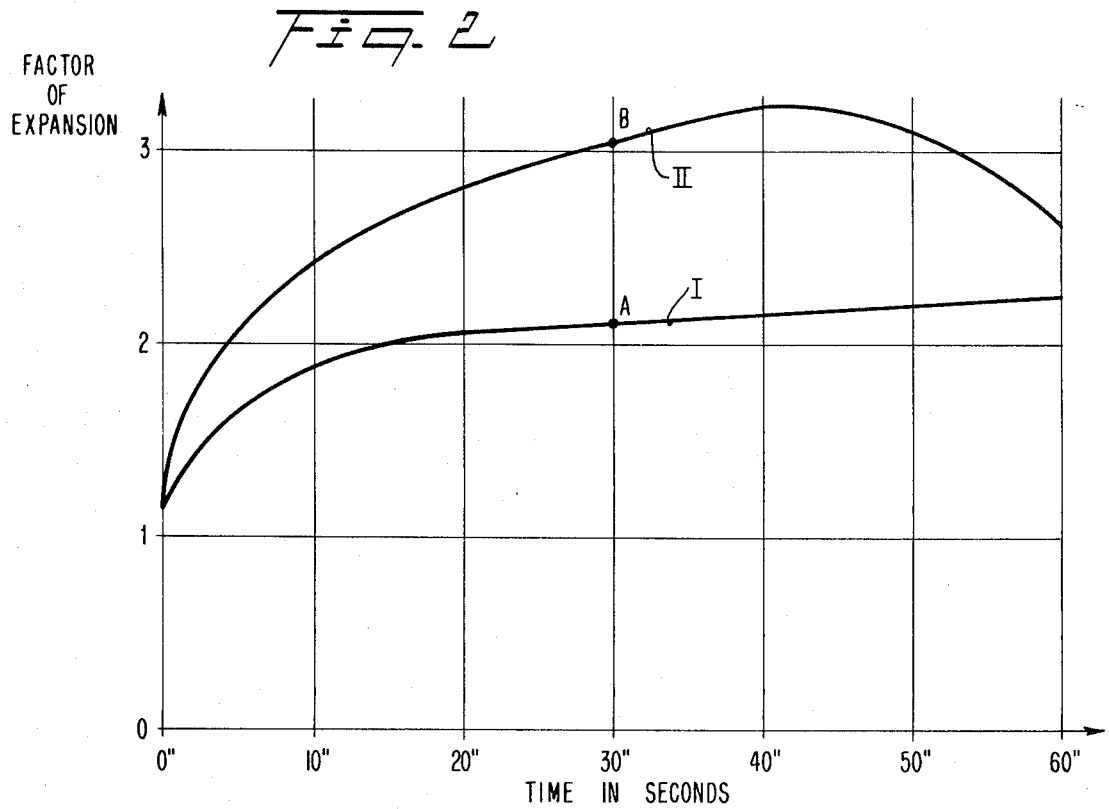
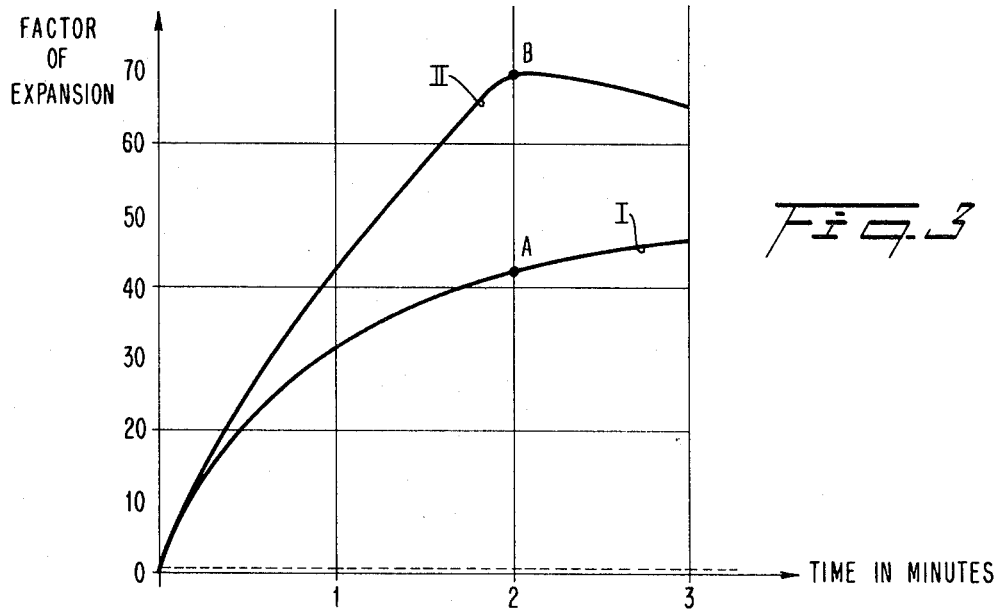

United States Patent Office 3,723,362
Patented Mar. 27, 1973

3,723,362
LOW DENSITY POLYSTYRENE PEARLS AND METHODS OF MAKING THEM
Jean Battigelli, Rantigny, Oise, France, assignor to Saint-Gobain, Neuilly-sur-Seine, France
Filed Oct. 21, 1968, Ser. No. 769,043
Claims priority, application France, Nov. 14, 1964, 128,060
Int. Cl. C08f 33/02, 47/10
U.S. Cl. 260—2.5 B      11 Claims

ABSTRACT OF THE DISCLOSURE

Polystyrene pearls are made by insufflating polystyrene particles containing expansion agent by hot air followed by brief insufflation by superheated steam. A further advantage can be obtained by subjecting these expanded pearls to heat treatment in an autoclave. The successive treatments by hot air and steam are at atmospheric pressure and at temperatures which are adequate to soften the polystyrene and activate the expansion agent. Products can be produced which have any chosen density from 2.5 kg./m.$^3$ upward. Products of lowest densities are unique.

---

This invention is an improvement on the process described in the application identified as Daniel Hanton, Ser. No. 542,363, filed Apr. 13, 1966. That invention relates to expanded or blown polystyrene pearls adapted for making articles such as blocks, slabs, and shaped pieces and to a process for expanding the granules of polystyrene preparatory to the manufacture of articles. According to that invention polystyrene particles, preferably pearls containing blowing agent, were expanded until they had an apparent specific mass from 3 to 5 kg./m.$^3$, a degree of expansion and a lightness of product which had not previously been obtained. Prior to that invention the lightest specific mass obtained was on the order of 7 kg./m.$^3$. That process treated granules of expansible polystyrene at atmospheric pressure by successive and alternating treatments with hot air and steam, preferably with intermediate periods of rest between the treatments, and accompanied or not by insufflation with air during the period of rest at a temperature materially less than the temperature of the heat treatments. In one method of practicing that process the granules were heated with hot air at 90°–100° C. followed by the application of steam.

It is an object of the present invention to improve the identified process to make it more efficient and to produce more fully expanded and lighter (lesser mass per volume) pearls. The invention is particularly adapted to the manufacture of polystyrene pearls and it will be described in particular relation to that use. In that use the novel process can produce pearls having a previously unobtainable mass per volume of 2.5 kg./m.$^3$. By the use of the novel process it is possible to produce whatever density of product is desired, from the mass per volume of 2.5 kg./m.$^3$ upward. It is also an object of the invention to achieve the maximum change of phase of the blowing agent which is included in the pearls. The blowing agents employed in this case are those of the prior art such as low boiling hydrocarbons such as the pentane fraction. For lists of such blowing agents the reader may refer to publications on the subject. To fully expand the pearls so that they will not expand further in certain uses and to completely vaporize the blowing agent has been extremely difficult leading, in some cases, to considerable expansion of shaped objects in use. It is an object of this invention by securing maximum expansion to reduce to a minimum the capacity of objects made of cellular polystyrene to change shape afterwards under conditions such as continuous use at high temperature.

The objects of the invention are accomplished generally speaking by a process of which the final step involves a treatment of the polystyrene pearls with superheated steam. In the preferred case the superheated steam will be at a temperature such that the steam is dry but below the temperature at which the particles agglomerate. However, if the intent of the process is to produce shaped objects such as blocks of material, the temperature of the terminal treatment with superheated steam may go into the range at which the particles agglomerate but being kept below the temperature at which degradation would occur. In an excellent and preferred form of the invention, the entire process is carried out at atmospheric pressure but in instances where complete expansion of all residual blowing agent must be achieved and the ultimate degree of expansion attained, the pearls may undergo their final treatment with superheated steam in an autoclave.

The novel process involves a plurality of steps preferably with a period of rest at lower temperature between the steps. Taking the polystyrene particles which are to be expanded into cellular pearls, the first step of the process may be insufflation of the mass of the pearls at atmospheric pressure by hot air at a temperature circa 90°–100° C. Alternatively, the first step may involve the insufflation of the mass of particles by wet steam at atmospheric pressure. The wet steam may be applied at about 100° C. The final step of treatment by superheated steam may be on the order of 115°–117° C. for standard types of polystyrene.

Polystyrene is usually produced in very small, discrete particles which are the preferred raw material for the present process. The process may be applied to agglomerate pieces and shapes but is less satisfactory. The difficulty of achieving full treatment of internal particles is the greater as the particles are remote from the surface. In the description of the preferred form of the invention, therefore, it will be understood that the raw material of the process is particulate polystyrene. The process is also applicable to polysulfone resins, in the same manner, regard being paid to temperatures of agglomeration and disintegration.

It is apparent from the results obtained that something more is involved in this process than the application of heat but the nature of the reaction propagated by wet steam is not readily explained with present knowledge, nor is the superior action of dry steam presently explicable. It has been demonstrated that a treatment by hot air followed by steam is superior to two treatments by hot air and that the treatment by hot air followed by a treatment with superheated steam is superior to hot air plus wet steam. It has also been demonstrated that this superiority is further enhanced by providing a period of rest, preferably at cooler temperature, between treatments. It has also been demonstrated that the treatment by hot air can, in some circumstances, be replaced in the process by a treatment with wet steam followed by a treatment with dry steam, with or without an intermediate period of rest. While a single treatment by hot air followed by superheated steam is frequently sufficient to achieve a product satisfactory for many uses, it is sometimes desirable to repeat a series of treatments one or several times. Advantage may also be gained in some instances by expanding the polystyrene particles by some ordinary process before subjecting them to the treatment of the present invention.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein the like reference characters refer to like parts throughout the several views, FIG. 1 is a vertical diagrammatic longitudinal section through a simple and effective form of apparatus for carrying out the essential part of the process;

FIG. 2 is a graph comparing the results of the present invention with a treatment by hot air followed by saturated steam; and FIG. 3 is a graph comparing the effect of treatment with saturated steam at 100° C. with that obtained by superheated steam at 117° C.

The significance of these graphs will be explained after the process of FIG. 1 has been described.

The apparatus of FIG. 1 includes a hopper 10 which receives pearls 11 from conveyor 12. The conveyor may be pneumatic and the air employed may be heated, for instance to 60° C., in order to raise the temperature of the pearls toward that at which their expansion will begin. The hopper penetrates an oven 13 and deposits the particles of polystyrene on the upper suface of a belt conveyor 14 of which the upper level proceeds toward the right. The screen is a metallic mesh, of which the meshes are fine enough to prevent the pearls from being caught in the meshes and reducing the permeability of the mesh to gases. The tunnel furnace is divided into sections 15, 16, by appropriate baffles 17. Gas chambers 18, 19 are interposed between the courses of the belt on opposite sides of the baffle 17. Hot air is introduced into the chamber 18 by any suitable means at a temperature about 130° C. or higher to provide enough heat to raise the temperature of the pearls on the screen conveyor to a temperature about 110°–115° C. The time of residence of the pearls in chamber 15 is on the order of 30 seconds in many instances. The hot air escapes from the chamber 18 through a multiplicity of orifices and passes upward through a screen, insufflating the pearls, and passes out through a discharge orifice 20. A certain expansion takes place and the pearls enter the chamber 16, in which they are insufflated from above by superheated steam, which is injected through a series of perforated tubes 21, 22. The chamber 19 is aspirated to produce a sufficient degree of vacuum to draw the steam down through the expanding pearls. The steam passes from the chamber to a reheater to be returned for further use. The air and the steam are both used at atmospheric pressure. The superheated steam is introduced at a temperature sufficiently high to attain 115°–117° C. in the pearls. The residence of the pearls in this section is about 40 seconds in many instances. The vacuum serves the double purpose of drawing the steam through the pearls and of holding the pearls on the screen by steam pressure. It not infrequently happens that some slight softening and agglomeration of the pearls takes place during the treatment but it is so inconsiderable that lumps can be broken up and the pearls separated by light friction, such as may be supplied by a stiff rotary brush 23. The pearls fall onto a carrier belt 24 for transportation to stock or to other treatment. Another brush 25 removes any pearls which adhere to the carrier and deposits them on the belt. The carrier 14 is reheated in section 6 as it proceeds toward the hopper. The usual insulation and temperature controls will be employed to avoid heat loss.

The process of FIG. 1, as described, involves no period of rest between the hot air and the superheated steam treatments but such a period can be provided by elongating the tunnel, introducing baffles between sections 15 and 16 to provide an intermediate chamber and by supplying the intermediate chamber with cooler air, for instance at 70°–90° C.

As described, the apparatus and process will produce cellular polystyrene pearls having an apparent mass volume of 4 kg./m.$^3$ after a storage period of 24 hours at ordinary temperature from an initial mass volume of between 12–20 kg./m.$^3$. The terminal storage accomplishes an aging which may be accelerated by storing at a temperature between 20° and 70° C., the high temperatures producing the quicker aging.

The pearls made in accordance with the process just described are well suited to the production of boards and plates by compression at agglomerating temperature.

It is also a part of this invention to preheat the pearls with superheated steam at atmospheric pressure before subjecting them to the treatments with hot air and superheated steam above described, making a three step process of superheated steam, hot air, superheated steam, with or without periods of rest, preferably at lower temperature.

FIG. 2 compares the effect of two different treatments on the same kind of polystyrene. Curve I shows the effect of preheating the granules in the air to a temperature of 117° C. followed by heating in saturated steam at 100° C. For a residence in steam of 30 seconds the coefficient of expansion is 2.1 as illustrated in curve I. Curve II includes the identical heating with air to 117° C. followed by heating in superheated steam at 115°–117° C. The coefficient of expansion after 30 seconds residence in the steam is greater than 3, which is to say that the granules had acquired an apparent mass volume less than 4 kg./m.$^3$. It is regarded as astonishing that the substitution of superheated for saturated steam should have so great an effect. In both cases the polystyrene subjected to the treatments had an apparent mass volume of 12 kg./m.$^3$.

The apparent specific mass of the expanded polystyrene of the market ranges from 15 to 100 kg./m.$^3$. Industry has need of the lighter pearls for the formation by pressing or molding of plates, blocks, and shapes in various sizes because the lighter pearls are more readily shaped, insulate better, and require less material to fill a given space. It is a particular advantage of the invention that for most purposes it can be carried out on a simple conveyor in a tunnel oven of simple construction.

FIG. 3 illustrates a process in which the granules of polystyrene used as raw material had a real density (mass volume) of 1300 kg./m.$^3$. Part of these granules were treated with saturated steam at 100° C. (curve I) and another part was treated with superheated steam at 117° C. (curve II), both treatments being at atmospheric pressure. For an equal time of 2 minutes the factor of expansion was 43 for the treatment with saturated steam, and has exceeded 68 for the superheated steam. This cannot be accounted for by a temperature difference of 17° C.

In the first section of the apparatus the hot air can be replaced by saturated steam at 100° C. It is also possible in the first section of the apparatus to use superheated steam at 115°–117° C. In operating thus on expansible granules of polystyrene, having a true density of 1300 kg./m.$^3$, after 2 minutes in superheated steam at 117° C., the pearls have a true density of 18.7 kg./m.$^3$; whereas for the same duration in saturated steam the density is only 31.3 kg./m.$^3$. Furthermore, the minimal density obtained is always less by treatment with superheated steam. It is possible to produce pearls of which the true density of 16 kg./m.$^3$ corresponds to an approximate apparent mass volume of 8 kg./m.$^3$.

In treating other thermoplastic materials than polystyrene, it is necessary to take into consideration the softening temperature of the resin and to modify the treatment accordingly. For example, when using a polysulfone the treatment would be carried out in air at a temperature of 130°–200° C. followed by superheated steam at atmospheric pressure at 120°–140° C. It is to be understood, therefore, that the temperatures given for polystyrene are illustrative and are to be applied to the treatment of that resin. For other resins the optimum temperatures will be different and should be accommodated to the nature of the resin, its temperature of agglomeration, its temperature of softening, and its temperature of degradation utilizing the principles set forth for polystyrene and a polysulfone. Similar advantages will be obtained with other expansible thermoplasts.

According to another characteristic of the invention, a further treatment may be used to add to the merits of the process and to produce a lighter product. Also, a succession of operations may be carried out on the pearls, each including insufflation by hot air and by steam, but each operation involving different conditions from the others. The variation of the number and character of these operations can be used to produce specified products of different character, especially as to density. As in the prior cases, the product is improved by providing a period of rest between the different steps of the process.

In a preferred mode of this form of the invention the pearls are expanded by hot air, then by saturated steam, then by hot air, then by superheated steam at atmospheric pressure. A period of aging follows at lower temperature, for instance at room temperature, after which the pearls are heated in an autoclave under pressure autogenously generated. The autoclave treatment may be without any addition to the air of the autoclave or it may include treatment with preferably dry steam. This mode of the invention produces pearls having a mass-volume of about 2.5 kg./m.$^3$. Another advantage of this mode is that the yield of the apparatus is increased for any given degree of expansion of the pearls.

In each form of the invention it is advantageous to terminate the steps of expansion by a treatment with superheated steam.

The following examples illustrate the process and the flexibility imparted to it by various combinations of steps.

EXAMPLES 1-4

|  | Ex. 1 | Ex. 2 | Ex. 3 | Ex. 4 |
|---|---|---|---|---|
| Expansion by saturated steam: | | | | |
| Steam pressure (kg./cm.$^2$) | 0.6 | 0.6 | 0.6 | 0.6 |
| Temperature in the pearls (° C.) | 97 | 97 | 97 | 97 |
| Output of pearls per hour (kg.) | 70 | 70 | 70 | 70 |
| Density of product (kg./m.$^3$) | 16-17 | 16-17 | 16-17 | 16-17 |
| Rest: 2 hours at 70° C. or 12-24 hours at room temperature, density (kg./m.$^3$) | 16 | 16 | 16 | 16 |
| Expansion by hot air: | | | | |
| Air temperature (° C.) | 130 | | | 130 |
| Exposure (in seconds) | 26 | | | 26 |
| Temperature of pearls (° C.) | 112 | | | 112 |
| Expansion by saturated steam: | | | | |
| Temperature level of the pearls | 96 | | | 96 |
| Pressure on conveyor (kg./cm.$^2$) | 0.2 | | | 0.2 |
| Exposure (in seconds) | 13 | | | 13 |
| Output of pearls (kg./hr.) | 200 | | | 200 |
| Density of pearls (kg./m.$^3$) | 8.8 | | | 8.8 |
| Rest: 2 hours at 70° C. or 12-24 hours at room temperature, density (kg./m.$^3$) | 8.5 | | | 8.5 |
| Expansion by hot air: | | | | |
| Air temperature (° C.) | 130 | 130 | 130 | |
| Exposure (in seconds) | 18 | 15 | 13 | |
| Temperature of pearls (° C.) | 112 | 112 | 112 | |
| Expansion by superheated steam: | | | | |
| Steam temperature (° C.) | 115 | 120 | 115 | |
| Pressure against conveyor (kg./cm.$^2$) | 0.4 | 0.4 | 0.4 | |
| Exposure (in seconds) | 36 | 30 | 26 | |
| Output of pearls (kg./hr.) | 110 | 160 | 250 | |
| Density of pearls at output (kg./m.$^3$) | 7.5 | 6.7 | 8.5 | |
| Rest: 1-3 hours at 70° C., density (kg./m.$^3$) | 4 | 6 | 8 | |
| Autoclave: | | | | |
| Temperature in autoclave (° C.) | 112 | 112 | 112 | 112 |
| Exposure (in seconds) | 30 | 30 | 30 | 30 |
| Density of pearls discharged (kg./m.$^3$) | 3.7 | 4.5 | 5.7 | 6 |
| Rest: 1-3 hours at 70° C., density (kg./m.$^3$) | 2.5 | 3 | 3.5 | 4 |
| Final apparent mass-volume of the pearls in kg./m.$^3$ | 2.5 | 3 | 3.5 | 4 |

EXAMPLE 5

A sample of polystyrene particles containing expansion agent, a standard article of commerce, was divided into two parts and subjected to treatments which differ in order to demonstrate the advantage of the present invention. In apparatus similar to that shown in the drawings, the first division of the sample was pre-expanded at a rate of 70 kg./hr. by saturated steam, producing a product having a density, after rest, of 16 kg./m.$^3$. The second part of the sample was identically treated and had the same density.

The first product of the first sample was treated at 200 kg./hr. by hot air followed by saturated steam using the apparatus of the drawing. The density of this second product, after rest, was 8.5 kg./m.$^3$. The first product of the second part of the sample was identically treated and had the same density.

The second product of the first sample was treated at 110 kg./hr. by hot air followed by saturated steam in the apparatus of the drawing. After rest, the product had a density of 6 kg./m.$^3$. The second product of the second part of the sample was subjected in the same machine to expansion by hot air followed by superheated steam at the rate of 110 kg./hr. The density, after rest, was 4 kg./m.$^3$.

In a further step the third product of the first part of the sample was subjected to expansion by hot air followed by saturated steam at a rate of 110 kg./hr. It reduced its density from 6 to 4.5 kg./m.$^3$ after rest. The third product of the second part of the sample was put into an autoclave at 112° C. for 30 seconds. The product, after rest, had a density of 2.5 kg./m.$^3$.

EXAMPLE 6

A sample of commercial polystyrene containing expansion agent was divided into two parts of which the first part was expanded by saturated steam at 70 kg./hr., producing pearls having a density, after rest, of 16 kg./m.$^3$. The second part of sample was subjected to identical treatment with the identical result.

In a second step the pearls from the first treatment were treated at 160 kg./hr. with saturated steam, rested, and had a density of 12 kg./m.$^3$. This product was treated by saturated steam at a rate of 160 kg./hr. producing a density, after rest, of 9 kg./m.$^3$. Thus, the sample from its original density was reduced in three steps from 16 to 12 to 9 kg./m.$^3$.

The second part of the identical sample received the identical first treatment but in the second step was treated at a rate of 160 kg./hr. to expansion by hot air followed by superheated steam. The density of the product after rest was 6 kg./m.$^3$. This product was then put into an autoclave at 112° C. for 30 seconds which reduced the density to 3 kg./m.$^3$. Thus, the use of hot air followed by superheated steam cut the density of the product in half compared to that which was achieved by expansion with saturated steam and the use of the autoclave in the third step, in place of the use of saturated steam produced a density one-third that of the first sample.

The advantages of the invention are in the accomplishment of the objects of the invention in those characteristics of low density which could not be attained by prior art processes.

As many apparently widely different embodiments of the present invention may be made without departing from the spirit and scope thereof, it is to be understood that the invention is not limited to the specific embodiments.

What is claimed is:

1. The method of expanding granules of polystyrene containing a thermally vaporizable blowing agent which comprises suffusing the granules with hot air at atmospheric pressure at a temperature of about 90°–115° C. and thereafter suffusing the particles with superheated steam at atmospheric pressure, the temperature of the steam being about 115°–117° C.

2. The method of claim 1 which comprises subjecting the granules to a series of suffusions with superheated steam at atmospheric pressure and cooling and resting the granules between suffusions.

3. The method according to claim 1 which comprises suffusing the granules alternately with superheated steam and hot air a plurality of times.

4. The method according to claim 3 which comprises cooling and resting the polystyrene particles between treatments by the different gaseous agents.

5. The method of claim 1 in which the thermoplastic resin is in the form of substantial bodies containing many cohering particles.

6. The method according to claim 5 in which the resin is passed in sequence through separated zones at atmospheric pressure containing different gases, one of which is air and another superheated steam.

7. The method of claim 6 in which a zone of quiet and lower temperature intervenes between zones of the different gases at their effective operational temperatures.

8. A method according to claim 1 in which polystyrene granules containing blowing agent is heated by superheated steam to secure an initial expansion, is rested at lower temperature, is heated by hot air to a temperature between about 90° C. and the temperature of agglomeration, is rested at lower temperature, and is thereafter heated by superheated steam at atmospheric pressure.

9. The process according to claim 1 which comprises the additional steps of aging the granules at lower temperature after the expansion by superheated steam, and heating the granules in an autoclave under pressure autogenously generated.

10. The process according to claim 9 in which the autoclave treatment is conducted in contact with dry steam below the temperature which, and for less time than that which, would produce degradation of the product.

11. The process according to claim 9 in which the thermoplast comprises polystyrene.

References Cited

UNITED STATES PATENTS

| 2,884,386 | 4/1959 | McMillan et al. | 260—2.5 E |
| 3,468,820 | 9/1969 | Buchholz et al. | 260—2.5 B |
| 3,598,769 | 8/1971 | Hanton | 260—2.5 B |

FOREIGN PATENTS

| 605,088 | 9/1960 | Canada | 260—2.5 B |
| 1,074,854 | 1/1964 | Germany. | |

PAUL LIEBERMAN, Primary Examiner

W. J. BRIGGS, SR, Assistant Examiner

U.S. Cl. X.R.

260—2.5 HB, 93.5 A; 264—51